(12) United States Patent
Baumgarte

(10) Patent No.: US 12,248,731 B2
(45) Date of Patent: *Mar. 11, 2025

(54) DEFERRED LOUDNESS ADJUSTMENT FOR DYNAMIC RANGE CONTROL

(71) Applicant: Apple Inc., Cupertino, CA (US)

(72) Inventor: Frank Baumgarte, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,432

(22) Filed: Jan. 3, 2024

(65) Prior Publication Data

US 2024/0143271 A1 May 2, 2024

Related U.S. Application Data

(63) Continuation of application No. 17/501,839, filed on Oct. 14, 2021, now Pat. No. 11,907,611.

(60) Provisional application No. 63/111,759, filed on Nov. 10, 2020.

(51) Int. Cl.
*G06F 3/16* (2006.01)
*H04R 3/04* (2006.01)

(52) U.S. Cl.
CPC .............. *G06F 3/165* (2013.01); *G06F 3/162* (2013.01); *H04R 3/04* (2013.01); *H04R 2430/01* (2013.01)

(58) Field of Classification Search
None
See application file for complete search history.

(56) References Cited

U.S. PATENT DOCUMENTS

| | | |
|---|---|---|
| 9,559,651 B2 | 1/2017 | Baumgarte et al. |
| 9,576,585 B2 | 2/2017 | Bleidt |
| 9,607,624 B2 | 3/2017 | Baumgarte |
| 9,608,588 B2 | 3/2017 | Baumgarte |
| 10,109,288 B2 | 10/2018 | Baumgarte |
| 10,453,463 B2 | 10/2019 | Baumgarte |
| 11,907,611 B2 | 2/2024 | Baumgarte |
| 2014/0294200 A1 | 10/2014 | Baumgarte et al. |
| 2014/0297291 A1 | 10/2014 | Baumgarte |
| 2017/0032793 A1 | 2/2017 | Baumgarte |
| 2017/0094409 A1 | 3/2017 | Baumgarte |

FOREIGN PATENT DOCUMENTS

| | | |
|---|---|---|
| JP | 2008505586 | 2/2008 |
| JP | 2017534903 | 11/2017 |

(Continued)

OTHER PUBLICATIONS

"Information technology—MPEG audio technologies—Part 4: Dynamic range control," International Standard ISO/IEC 23003-4 Second Edition, Jun. 2020, 272 pages.

(Continued)

*Primary Examiner* — James K Mooney
(74) *Attorney, Agent, or Firm* — Aikin & Gallant, LLP

(57) ABSTRACT

A bitstream is obtained by a decoder side, that contains an encoded version of an audio signal and an instantaneous loudness sequence of the audio signal. The instantaneous loudness sequence has not been loudness normalized. A dynamic range control, DRC, gain sequence is produced by applying the instantaneous loudness sequence to a DRC characteristic, with loudness normalization. The DRC gain sequence is applied to the decoded audio signal. Other aspects are also described and claimed.

21 Claims, 11 Drawing Sheets

(56) References Cited

FOREIGN PATENT DOCUMENTS

JP          2018522286       8/2018
WO         2015038475       3/2015

OTHER PUBLICATIONS

"Information technology—Coding-independent code points—Part 3: Audio," International Standard ISO/IEC 23091-3 First Edition, Apr. 2018, 30 pages.

"Information technology—Coding of audio-visual objects—Part 12: ISO base media file format," International Standard ISO/IEC 14496-12 Fifth Edition, Dec. 15, 2015, 248 pages.

"Algorithms to measure audio programme loudness and true-peak audio level," International Telecommunication Union ITU-R Radiocommunication Sector of ITU, Recommendation ITU-R BS.1770-4, Oct. 2015, 25 pages.

Combined Search and Examination Report for UK Application No. GB2116188.0 mailed May 10, 2022, 6 pages.

Office Action from the German Patent and Trademark Office for German Application No. 10 2021 128 853.3 mailed Jul. 26, 2022, 14 pages.

Examination Report under Section 18(3) for UK Application No. GB2116188.0 mailed Dec. 22, 2022, 1 pages.

Notification of Reasons for Rejection for Japanese Application No. 2021-183523 mailed Nov. 28, 2022, 4 pages.

International Standard, "Information technology—MPEG audio technologies—Part 4: Dynamic range control," ISO/IEC 23003-4 Second Edition, Jun. 2020, pp. i-v, 75-81, 136-138, 158-160, 205-207, and 243.

ISO, "White Paper on MPEG-D Dynamic Range Control", International Organisation For Standardisation Organisation Internationale De Normalisation, ISO/IEC JTC1/SC29/WG11, Coding of Moving Pictures and Audio, Feb. 2015, Geneva, Switzerland, 19 pages.

DEFERRED LOUDNESS ADJUSTMENT FOR DYNAMIC RANGE CONTROL

This application is a continuation of co-pending U.S. patent application Ser. No. 17/501,839, filed Oct. 14, 2021, which is a continuation of U.S. Provisional Application No. 63/111,759 filed Nov. 10, 2020.

BACKGROUND

A sound program, such as music, a podcast, a live recorded short video clip, or a feature film, has loud and soft segments that define its dynamics and dynamic range. In many situations, such as listening through a headset in a noisy environment or through loudspeakers at home in a late-night scenario, it is desirable to reduce the dynamics and dynamic range of the playback sound to improve the listener's experience. Dynamic range compressors are used for that purpose. They are digital signal processors that apply a time-varying gain to an input, digital audio signal (of the sound program) so as to amplify soft segments and attenuate loud segments of the audio signal. To avoid audible pumping artifacts that can result from dynamic range compression of an audio signal, a loudness normalization process can be performed that "aligns" the input audio signal to a compression characteristic or profile, while compressing the audio signal according to the compression characteristic. This may be done by offsetting the instantaneous loudness of the input audio signal with its program loudness, where program loudness is a computed value that aims at describing the overall loudness of the sound program (also referred to as integrated loudness.)

SUMMARY

Audio coding standards define methods for dynamic range compression that generate dynamic range control, DRC, gains at an encoder side where the sound program is being created or is being prepared for distribution or for storage/archiving. The DRC gains are referred to here as a DRC gain sequence that is time aligned with its associated sound program, such that one or more gain values in the sequence are to be applied to a corresponding digital audio frame of the sound program. The DRC gain sequence is then formatted for example as metadata associated with the sound program, into one or more bitstreams. A decoder side obtains the bitstream and applies the in-stream DRC gains to compress the dynamic range of the decoded audio signal, if desired by the decoder side (typically during playback of the decoded audio signal.) An advantage of such a metadata-based approach is quality improvement due to a larger look-ahead time interval for offline encoding of the DRC gains, than otherwise possible for real-time compression. Another advantage is that the compression characteristic can be controlled at the encoder side, for example according to the expertise of the sound program creator or distributer.

For metadata-based DRC in online applications (e.g., live audio streaming, and recording live audio to a file), there is a challenge if the program loudness of the sound program that is being streamed for playback or written to a file for storage is yet unknown (because the sound program has not ended yet). That is because the compressor characteristic might not be properly adjusted (or loudness normalized) if the actual program loudness of the sound program (which can only be determined once the sound program has ended) deviates significantly from what was expected or predicted.

Several aspects of the disclosure here are novel digital signal processing methods of deferring loudness adjustment (loudness normalization) for dynamic range control (DRC), from the encoder side to the decoder side. Other aspects are techniques for changing the compressor characteristic in the decoder side when using metadata-based DRC gain sequence processing, with loudness normalization. These aspects are especially beneficial for applications such as live streaming and also live recording to a file.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
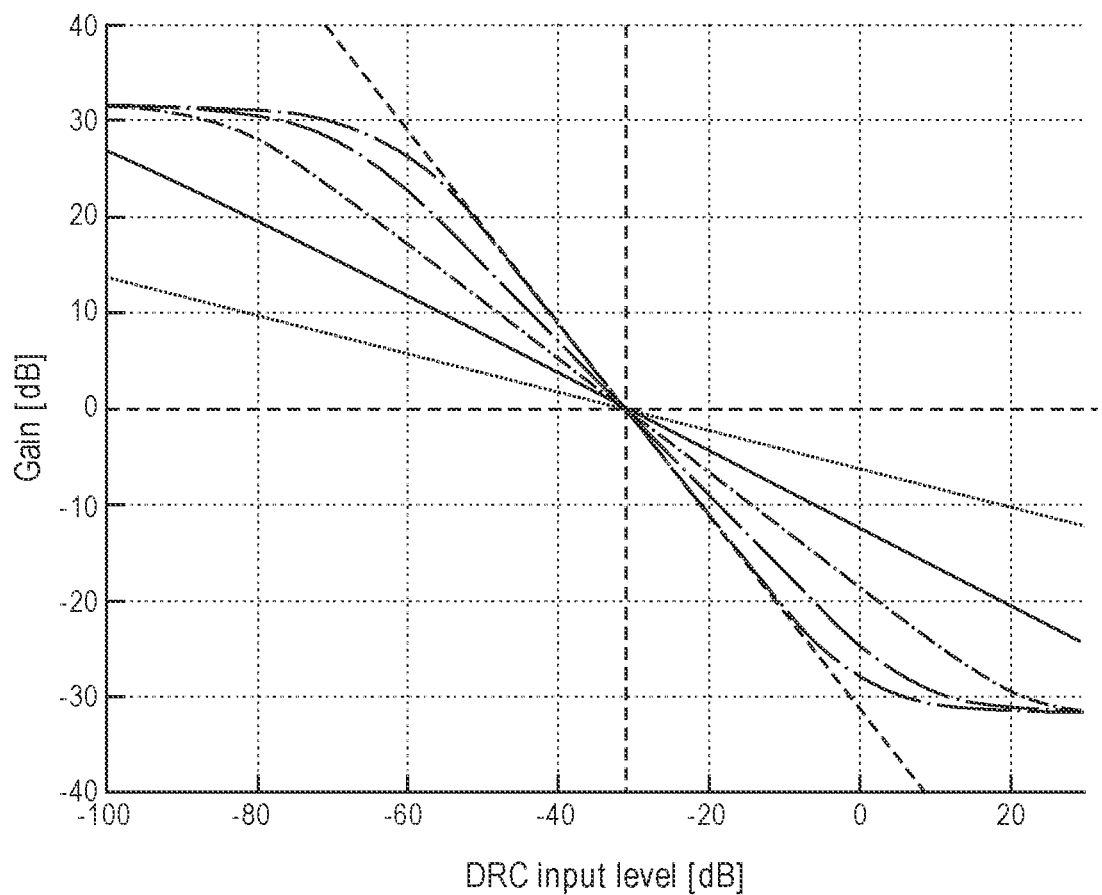
FIG. 1 shows example DRC characteristic curves.

In order to properly apply dynamic range control to an audio signal, a compressor characteristic (DRC characteristic, DRC profile) should be "aligned" with the loudness level range of the audio signal. For instance, referring to FIG. 1, the alignment is along the input level axis so that the zero-crossing of the DRC characteristic curve is roughly at the center of the loudness level range of the audio signal. The level at the zero-crossing point is also referred to as DRC input loudness target—in the example set of characteristic curves shown in FIG. 1, that level is approximately −31 dB. The center of the loudness level range may for example be the average level of the sound program, or the average dialog level in the sound program. The process for achieving such alignment is referred to here as loudness normalization, in connection with DRC of an audio signal, to a given loudness target. For example, the loudness of the audio signal (sound program) may be a single value known as integrated loudness. Integrated loudness is a measure of loudness of an audio signal, that is similar to a root mean squared, RMS, but more truthful in terms of human hearing. It may be equivalent to program loudness in that it measures how loud a sound program is over its entire duration. To achieve loudness normalization, the integrated loudness when given in units of decibels, dB, can be subtracted from the DRC input loudness target to derive the normalization gain in dB. The normalization gain is added to the output of a loudness model that is computing the instantaneous loudness of the audio signal (sound program.) The instantaneous loudness may be a sequence of loudness values each computed based upon (and representing human perceived loudness of) a respective, digital audio frame that constitutes the input digital audio signal. Another way to achieve loudness normalization is to shift the DRC characteristic curves depicted in FIG. 1 to the right or to the left of zero dB (by the amount of the normalization gain.) In the example of FIG. 1, the curves have been shifted left to −31 dB (the loudness target, in this example), and is therefore properly aligned with (and can therefore be applied directly) to a sound program having an integrated loudness of −31 dBA (A-weighted) or LKFS (loudness K-weighted level full scale)—in other words, the normalization gain in that case would be zero dBA.

If the integrated loudness of a sound program is yet unknown when the dynamic range control signal processing is ongoing, as is the case for live audio, then a prediction needs to be made for applying loudness normalization. The prediction however may be incorrect thereby resulting in DRC gains that have an undesired bias in them, or resulting in DRC gains that produce pumping effects—undesired loudness shifts between the uncompressed portions and the compressed portions of the audio signal.

To reduce the likelihood of the undesirable loudness shift, an aspect of the disclosure here applies loudness normalization to DRC in the decoder side, rather than in the encoder side, of an audio codec system or method. An example of the audio codec system and associated method is shown in the hardware block diagram of FIG. 2. The various hardware blocks of the audio codec system and method may be implemented by programmed processors. In such a method, the integrated loudness (which is needed by the loudness normalization performed in connection with DRC for playback or for archiving/storage of the decoded audio signal) can be obtained in at least two instances which will be described below in connection with FIG. 3 and FIG. 4.

Figure 2:
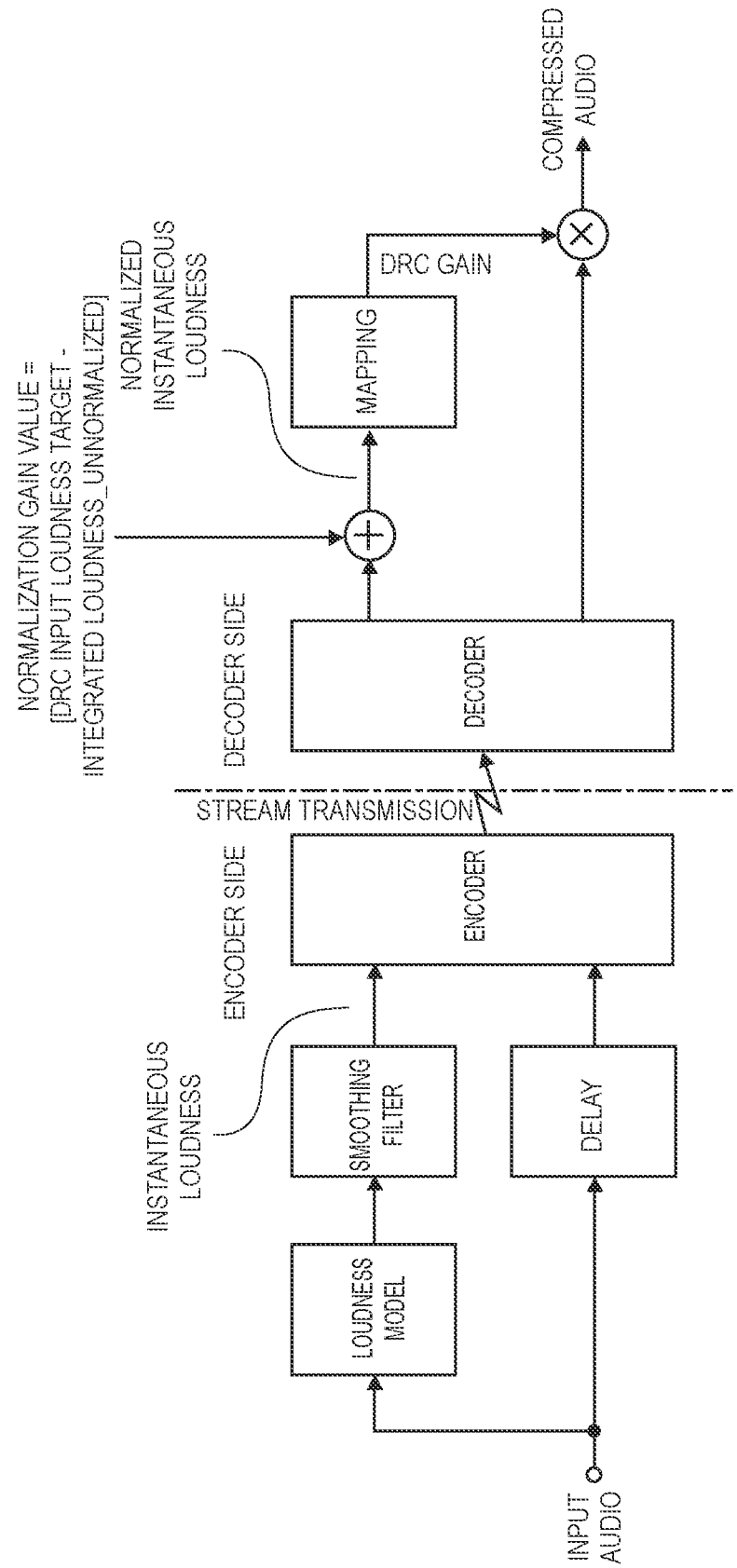
FIG. 2 is a block diagram of an audio codec system that applies DRC in the decoder side, and without loudness normalization being performed in the encoder side.

Beginning with FIG. 2, the audio codec system has an encoder side that may be implemented by one or more processors that execute or are configured by instructions stored in memory generically referred to here as "a programmed processor", for example in one or more servers. The upper audio signal processing path includes a side chain, which includes a loudness model that computes or estimates the instantaneous loudness of a digital, input audio signal (sequence), also referred to here as the sound program. This estimation is based on a perceptual loudness scale (such as a sone scale), hence it is approximately logarithmic. To smooth the instantaneous loudness sequence over time, a smoothing filter can be applied as shown. It results in smoothing in areas of the input audio sequence where compression gain changes are not desired but keeps macro-dynamic loudness transitions unaffected.

The lower audio signal processing path includes a delay block that delays the input audio sequence, to compensate for the delay that is due to the side chain. The smoothed loudness sequence and the delayed input audio sequence are then fed to an encoder.

The encoder performs bitrate reduction operations upon one or both of its inputs and may produce one or more bitstreams that contain bitrate reduced versions of one or both of its inputs. The one or more bitstreams may then be either transmitted to a decoder side (e.g., over the Internet) or they may be written to a file for storage or archiving until accessed by a decoder side process. The smoothed loudness (referring to a sequence of smoothed loudness values, or to a single smoothed loudness value) may be carried as metadata in the same bitstream as the delayed input audio sequence, e.g., associated with their "corresponding" Advanced Audio Coding, AAC, audio frames. This is also referred to as being in the audio layer. Alternatively, the smoothed loudness sequence and other loudness values such as integrated loudness updates and DRC payloads (as discussed further below) may be transmitted not in the audio layer but in a higher layer such as in the file format level. In both instances, one or more bitstreams are produced in which the encoded audio is provided along with associated metadata such as the smoothed loudness sequence or as described below in other aspects, instructions to the decoder side for applying an encoder-sourced DRC gain sequence.

The decoder side may also be implemented as a programmed processor, e.g., one or more processors that execute or are configured by instructions stored in memory as part of an audio playback device. Note here that the decoder side processes may be implemented in the same audio playback device as the encoder side processes. Alternatively, the decoder side processes may be implemented in an audio playback device that is separate from the programmed processor that performs the encoder side processes. Examples of the audio playback device include a smartphone, a tablet computer, a digital media player, a headset, or a vehicle infotainment system. In the decoder side, a decoder undoes the bitrate reduction operations of the encoder, to recover the smoothed loudness sequence and the delayed input audio sequence. The decoded smoothed loudness value is then mapped to a "corresponding" DRC or compression gain value. This mapping is a memory-less input-output function that implements for example one of the curves illustrated in FIG. 1 (or alternatively any other desired curve.) The mapping constitutes the compressor characteristic or compressor profile (DRC characteristic) whose output is a time-varying gain (a sequence of DRC gain values) that is a function of a time-varying input loudness level. The mapping may also include a conversion from the logarithmic loudness domain to the linear domain of the DRC gain. The DRC gain values (sequence) are then applied, as depicted by the multiplier symbol in the figure, to the decoded audio signal, if compression is desired. Although not shown, the compressed audio may then be passed to a playback processing block that ultimately produces transducer (speaker) driver input signals that convert the compressed audio into sound.

In FIG. 2, it can be seen that the smoothed loudness sequence is adjusted or normalized, in the decoder side, prior to being input to the DRC mapping block. For example, a constant, integrated loudness (a single value) can be subtracted (in dB domain) from the DRC input loudness target to derive the normalization gain in dB. The normalization gain is added to each smoothed loudness value that is in the smoothed loudness sequence, to yield a normalized loudness sequence which is used in the DRC process. There are at least two applications of such a DRC process, e.g., live, or real-time streaming and live recording to file for storage or archive.

Figure 3:
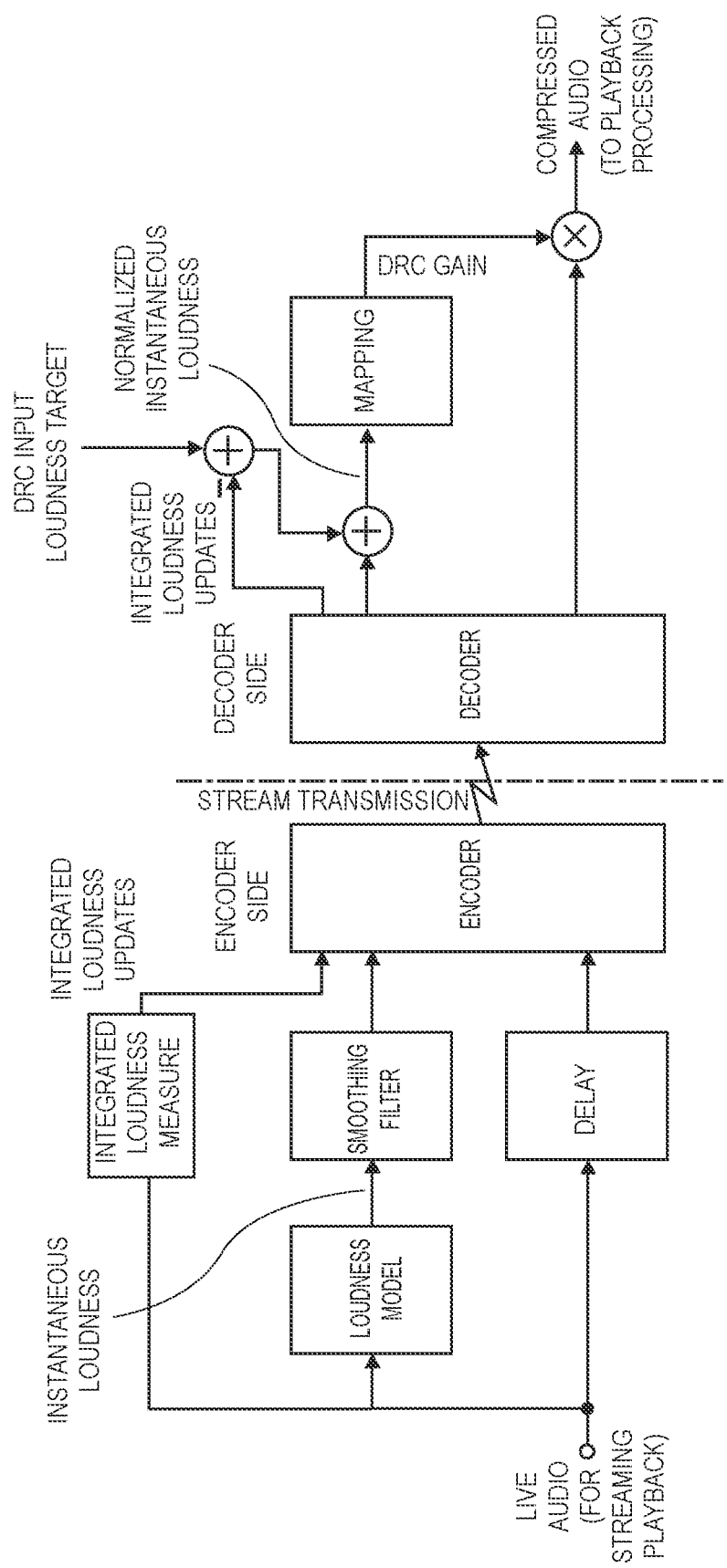
FIG. 3 is a block diagram of an audio codec system that applies DRC in the decoder side, without loudness normalization being performed in the encoder side, suitable for live streaming.

In one such application, referring now to FIG. 3, the input audio at the encoder side is a live or real-time digital audio recording that is being streamed to the decoder side, e.g., over the Internet. The input audio contains audio capture of a live or real-time event taking place contemporaneously with the encoding and bitstream transmission. As such, a single, integrated loudness value that represents the entire sound program cannot be computed until the live event has ended. Until then, an integrated loudness measure block in the encoder side collects samples of the live audio, that is being sent to the encoder delayed for time alignment, over a time interval that is longer than a single audio frame of 5-100 msec, such as a few seconds, and computes a measure of loudness of that interval. It then "integrates" or collects several of such measures going back to the start of the sound program, e.g., averages them, to compute an integrated loudness update. The integrated loudness update may be a measure of integrated loudness only for the portion of the sound program that has been played back or streamed until the current update. This measure is repeated, e.g., periodically, to produce in effect a "running average" integrated loudness, and transmits the latest, integrated loudness update (which is a single value) to the decoder side. Note that the term "running average" as used here does not require an actual average to be performed, just some measure of loudness of the sound program from the start of the program until the current update, based on collecting loudness measurements including evaluating statistics of the collected loudness measurements. The updates (running averages) may be computed and then provided as part of a bitstream that also contains the encoded sound program (encoded audio signal), as a plurality of instances of an integrated loudness update field, with adjacent instances in the bitstream being between one to ten seconds apart, over the duration of the sound program.

Note also that the term "integrated loudness update" may also be referred to as a running average loudness or a "partial integrated loudness"; at the end of the sound program the last or final integrated loudness update may represent the loudness of the entire sound program (also referred to as the integrated loudness or program loudness as for example described in Recommendation ITU-R BS.1770-4 (10/2015) Algorithms to measure audio program loudness and true-peak audio level.)

In the decoder side, a decoder obtains the bitstream and extracts therefrom the integrated loudness update which a decoder side process then applies to loudness normalize the DRC process. This may be done by for example adding a single, loudness normalization gain value (e.g., the difference between the DRC input loudness target and the integrated loudness update value) to a decoded or recovered instantaneous loudness sequence before input to the DRC characteristic mapping block. Alternatively, loudness normalization may be done by shifting the DRC characteristic along its input axis by an amount equal to the loudness normalization gain value. The loudness normalization gain may be periodically updated during transmission of the bitstream (sound program), with the latest, partial integrated loudness value (integrated loudness update) that has been computed in the encoder side for the lapsed portion of the live event.

Figure 4:
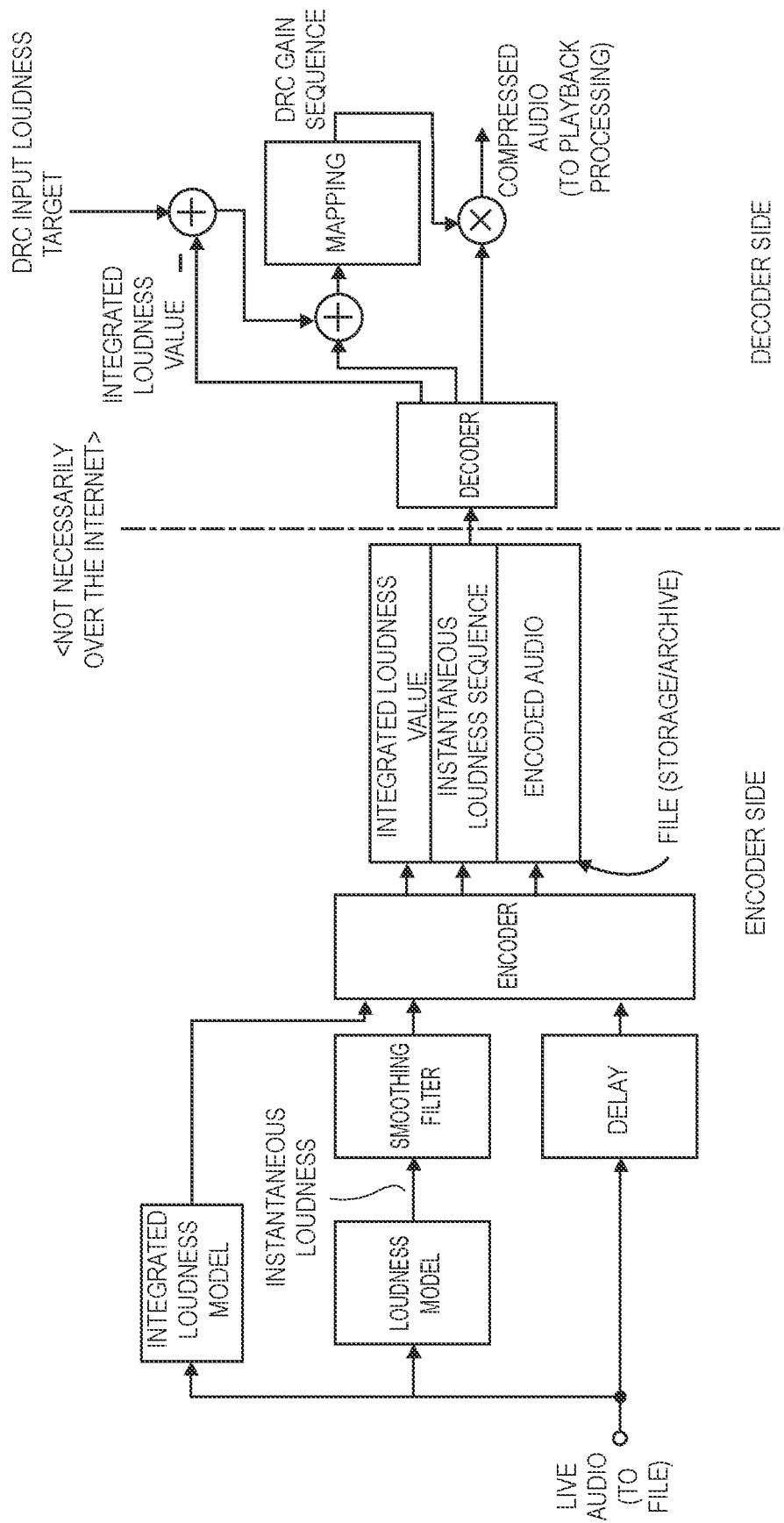
FIG. 4 is a block diagram of an audio codec system that applies DRC in the decoder side, without loudness normalization being performed in the encoder side, suitable for live recording to storage or archive.

In another application, referring now to FIG. 4, the input audio at the encoder side is a live or real-time digital audio recording of an event that is to be written to a file at the end of the recording (when the event ends) for purposes of archiving or storage. A single, integrated loudness value that represents the program loudness of the entire live audio event can be computed at the end of the recording by the integrated loudness model block and provided to the encoder as soon as the event has ended. The encoder writes the integrated loudness value into a file along with an encoded version of the live audio, and with an encoded version of the instantaneous (and smoothed) loudness sequence that was being computed by the loudness model (based upon the same live audio). In the decoder side, a decoder obtains the file (bitstream), and decodes the input audio and the instantaneous loudness sequence from the file, extracts the integrated loudness value from the file. A decoder side process then uses the integrated loudness value to loudness normalize the decoded, instantaneous loudness sequence before input to a DRC (compression) mapping block, the output of which is then applied to the decoded input audio (if compression is desired) during playback.

In one aspect, the smoothing filter is a nonlinear filter such one that is described in U.S. Pat. No. 10,109,288. A useful property of the filter is that its output can be level-shifted by the same amount as the input. That means, when defining $f(x)$ as the nonlinear filter function, $x(n)$ as the input signal, and $y(n)$ as the output, one can write $$y(n)=f(x(n))$$

Given a shift of the input signal by $\Delta L$, $f(x)$ fulfills the shift property if the output is shifted by $\Delta L$, or expressed mathematically:

$$y(n)+\Delta L=f(x(n)+\Delta L)$$

This is beneficial because it avoids any sidechain processing in the encoder side that has a dependency on absolute loudness values.

Figure 5:
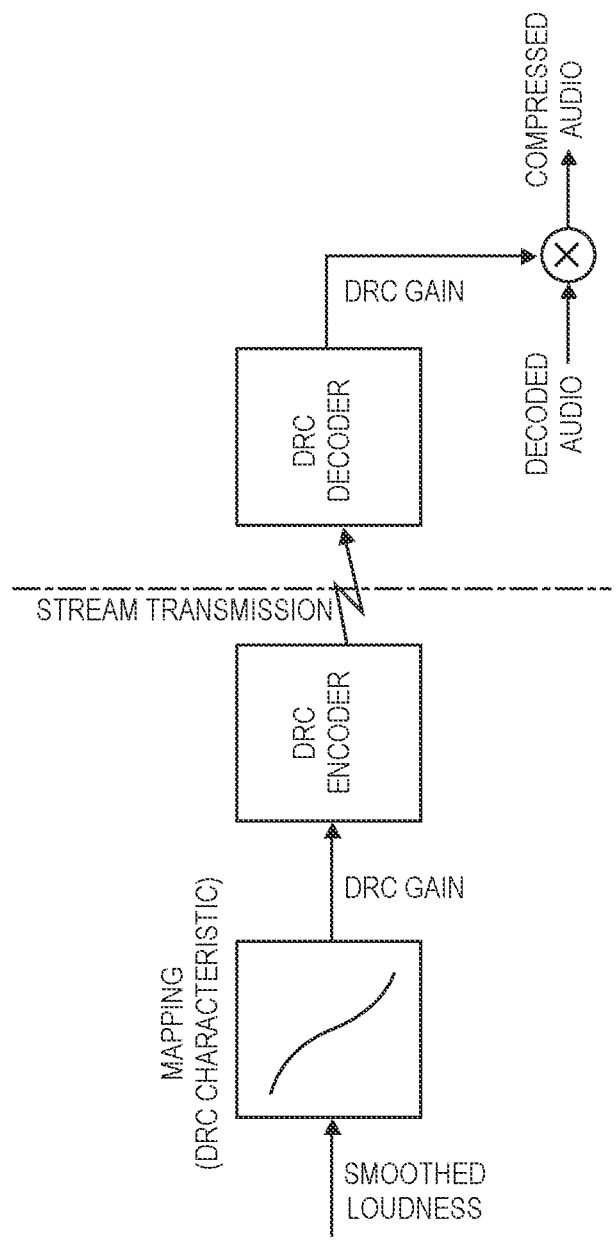
FIG. 5 depicts part of an MPEG-D DRC compliant audio codec system that applies DRC in the decoder side.

Another aspect of the disclosure here is a way to apply DRC in compliance with the MPEG-D DRC standard ISO/IEC, "Information technology—MPEG Audio Technologies—Part 4: Dynamic Range Control," ISO/IEC 23003-4: 2020 ("MPEG-D DRC"), extended to support loudness normalization at the decoder side. FIG. 5 shows a simplified block diagram of part of the MPEG-D DRC processing that generates and applies the DRC gains, based on decoding the DRC gains from the metadata in a bitstream obtained from the encoder side. MPEG-D DRC provides predefined DRC characteristics and flexible ways to encode parameterized characteristics.

In FIG. 5, the encoder side applies a smoothed, instantaneous loudness sequence (computed for an input audio sequence) to a selected DRC characteristic (also referred to as a "mapping block" as used above in connection with FIG. 2.) An output of the DRC characteristic mapping block produces a DRC gain sequence which is then fed to a DRC encoder. The latter is performing bitrate reduction to encode its input sequences into one or more bitstreams that are then transmitted to or otherwise made available to the decoder side. In the decoder side, a DRC decoder undoes the bitrate reduction encoding, to recover the DRC gain sequence (decoded DRC gain sequence.) The decoded DRC gain sequence is then applied to the decoded audio signal (if compression is desired.)

Figure 6:
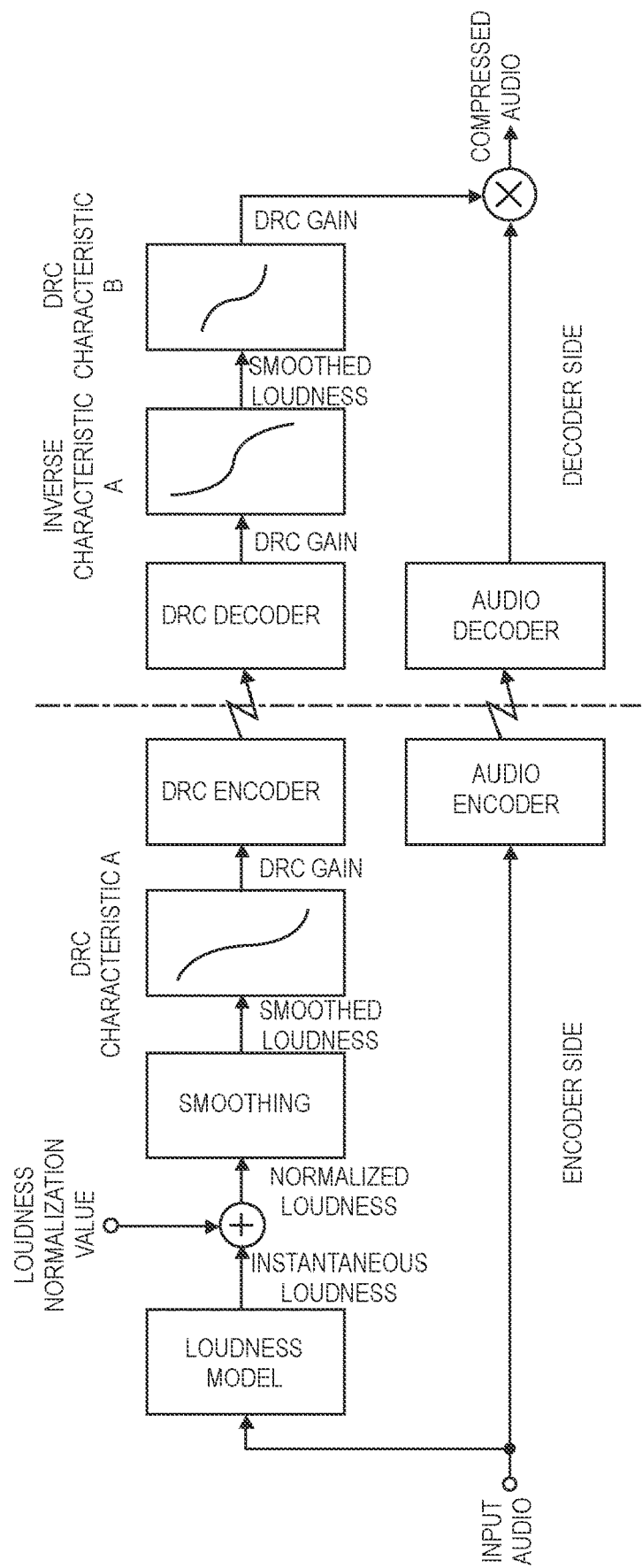
FIG. 6 depicts part of an MPEG-D DRC compliant audio codec system that applies DRC in the decoder side with loudness normalization in the encoder side.

MPEG-D DRC also supports a type of decoder side processing which changes the DRC characteristic that is applied to compress the sound program, from the one used in the encoder side as seen in FIG. 5 (to compute the DRC gain sequence that was inserted into the bitstream as metadata), to a different one that may be selected by decoder side processing based on a current playback or listening condition. This is achieved in the decoder side as shown in FIG. 6, by first applying the encoder side DRC gain sequence to an inverse characteristic A, which is an inverse of the DRC characteristic A that is being applied in the encoder side to produce the encoder side DRC gain sequence. An index (identifier or pointer) to the DRC characteristic A (that was used in the encoder side to produce the DRC gain sequence) may be provided in the bitstream, so that the decoder side can identify the inverse characteristic A. Applying the DRC gain sequence as input to the inverse characteristic A results in a recovered, smoothed instantaneous loudness sequence. If quantization effects are ignored, the recovered loudness sequence (at the output of the inverse characteristic A block) is essentially the smoothed loudness sequence that was used by the encoder side processing. As a result, the recovered loudness sequence can be applied to a second DRC characteristic B, to produce a second DRC gain sequence that may be more suitable to compress the decoded audio signal (than DRC characteristic A.) The second DRC gain sequence is then applied to the decoded audio (if compression is desired for example during playback.)

Figure 7:
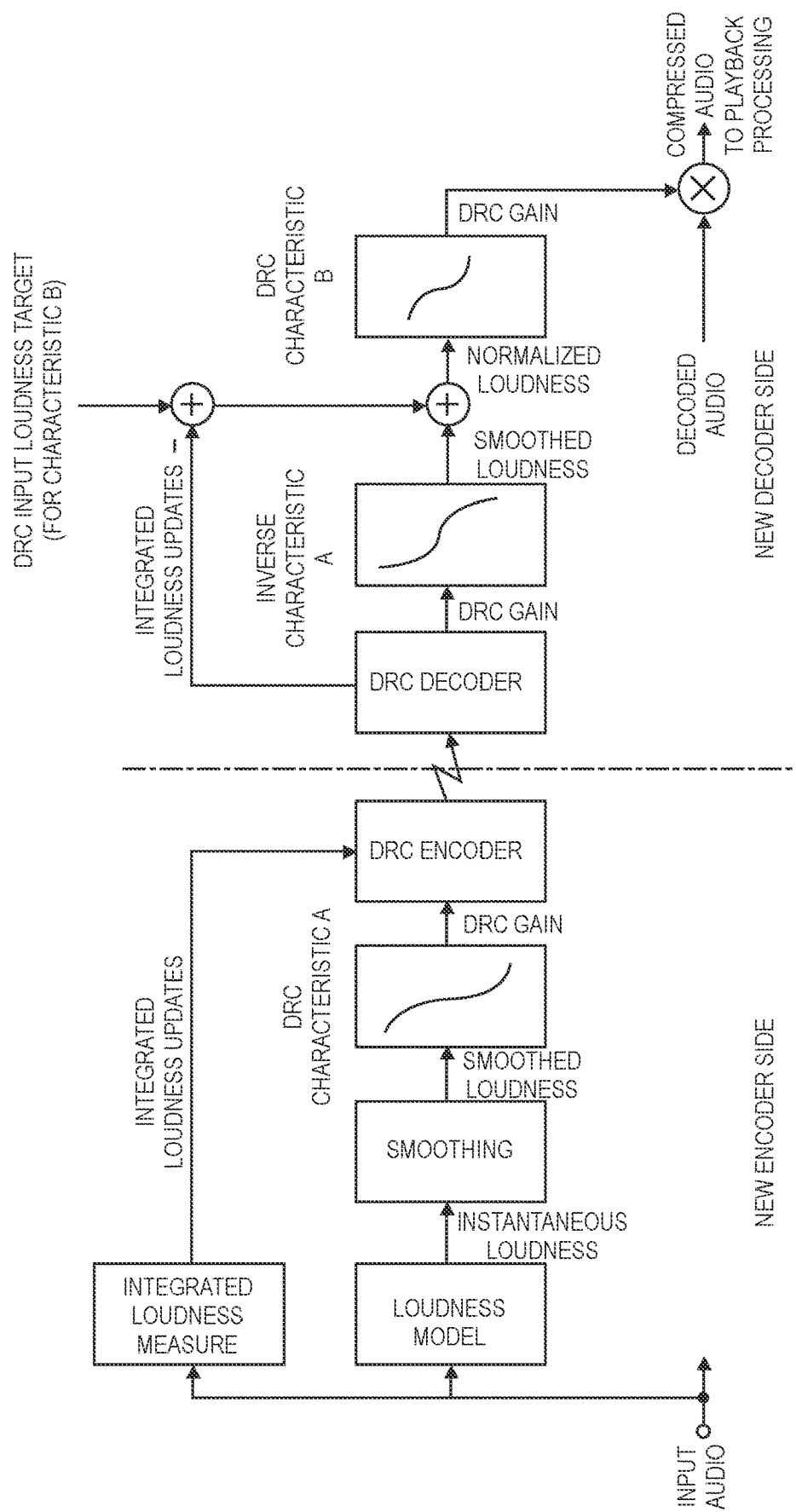
FIG. 7 depicts part of an MPEG-D DRC compliant audio codec system that applies DRC with loudness normalization in the decoder side.

In accordance with one aspect of the disclosure here, the loudness normalization of the sidechain in the encoder side shown in FIG. 6 is replaced using the approach shown in FIG. 2. That means, the integrated loudness-based offset (normalization gain) is applied in the decoder side instead of in the encoder side. FIG. 7 shows a block diagram of such a system. This is also referred to here as an enhanced MPEG-D DRC compliant system (also referred to below as having a "new" encoder and a "new" decoder.) Such a system has, in its encoder side, a block called integrated loudness measure whose output provides integrated loudness value updates, as was discussed above in connection with FIG. 3. The integrated loudness updates are provided to an audio encoder. Here, the encoder is a DRC encoder that also encodes a DRC gain sequence (in addition to the input audio.) The DRC gain sequence may have been determined as described above in connection with FIG. 6. The encoded DRC gain sequence and the integrated loudness updates are provided via one or more bitstreams to the decoder side. The DRC gain sequence may be formatted as metadata, associated with the encoded input audio that is also being provided to the decoder side.

The integrated loudness measure is a running measurement (also referred to here as a running average) of integrated loudness, taken starting at the beginning of the sound program and continues over time to "integrate" the audio signal of the sound program for the purpose of computing an integrated loudness value only for the elapsed portion of the sound program. As the audio signal (sound program) continues, the integrated loudness measure produces updates, e.g., periodically, for example every ten seconds. These integrated loudness updates are written into the bitstream (e.g., by the DRC encoder.) This can be supported in MPEG-D DRC by either writing the updates into extension fields or extension payloads of the audio bitstream or writing them into a separate metadata track as part of an MP4 file. Without introducing additional system delay, the updates can have a look-ahead equal to the latency of the sidechain that is producing the DRC gain sequence (at the output of the DRC characteristic A block.) A larger look-ahead can improve the first integrated loudness update at the start of the sound program, i.e. it may be closer to the program loudness of the sound program.

In a first case that may be illustrated by FIG. 7, the input audio is live audio that, via the bitstream, is being contemporaneously streamed to the decoder side (for example over the Internet) to a decoder side. In that case, the program loudness cannot be provided during the streaming (because the live audio event has not ended yet.) In that case the DRC (being applied in the decoder side) is dynamically adjusted or loudness normalized, based on the in-stream integrated loudness updates as shown—a dynamically changing normalization gain that may be equal to the difference between the DRC input loudness target value and the dynamically changing integrated loudness update. To limit the rate of change in the integrated loudness update, the update sequence may be smoothed at the beginning of the stream but not at the end of the stream. Also, the initial update values (at the beginning of the stream) may consider an expected loudness of the input audio. For example, the expected loudness may be the outcome of a careful professional studio setup and pilot measurements of the lapsed initial portion of the input audio.

In a second case, the input audio (in the encoder side) is a live audio recording that is being written to an audio file in the encoder side as in FIG. 4 (rather than being live streamed.) In that case, the final integrated loudness update (the true, integrated loudness or program loudness of the sound program) can be written to the file at the end of the recording, without requiring a rewrite of the file. When seeking to comply with MPEG-D DRC this can be accomplished by writing (in the encoder side) the final integrated loudness update to a loudness "box" or field at the ISO Base Media File Format level. The Audio Stream Loudness box type is called ludt. Still referring to FIG. 7, when the encoded audio and its associated encoder side DRC gain sequence and integrated loudness updates are obtained by the decoder side, a decoder side process may apply DRC by determining the DRC gain sequence (using DRC characteristic B) based on a loudness normalized version of the decoded audio signal. This normalization, which in this example adjusts the recovered smoothed instantaneous loudness at the output of the inverse characteristic A, is preferably accomplished by using the final integrated loudness update value that was written into the loudness box. If the recording ended in the encoder side without adding the loudness box into the stream, then the DRC can still be applied with loudness normalization in the decoder side, by using the in-stream integrated loudness updates.

Since the in-stream integrated loudness updates may vary slowly over time, for example every 1-10 seconds, the normalization will effectively cause the DRC characteristic B to shift accordingly. This shift might become audible during playback of the decoded audio, at the beginning of the recording or stream, when the integrated loudness updates are based on a short duration (elapsed time interval) of the sound program. To limit the rate at which the integrated loudness updates change, the updates themselves may be smoothed at the beginning of the recording or streaming, but not at the end.

In an encoder side process that is in accordance with FIG. 6 where the input audio is a live recording to file, the input audio may be compressed (DRC) using sidechain loudness normalization and then encoded and written to file, in the encoder side. This might essentially result in compressed audio output that is comparable if not essentially the same as that which is available from a decoder side process that is in accordance with FIG. 7 where the decoded audio is compressed in the decoder side with loudness normalization being based on the bitstream-contained integrated loudness updates. However, an advantage of deferring the loudness normalization to the decoder side as in FIG. 7 is that by merely adding, when the recording or event has ended, the final integrated loudness update at the ISO Base Media File Format level MP4 level, the listening experience is improved when the file is played back.

Figure 8:
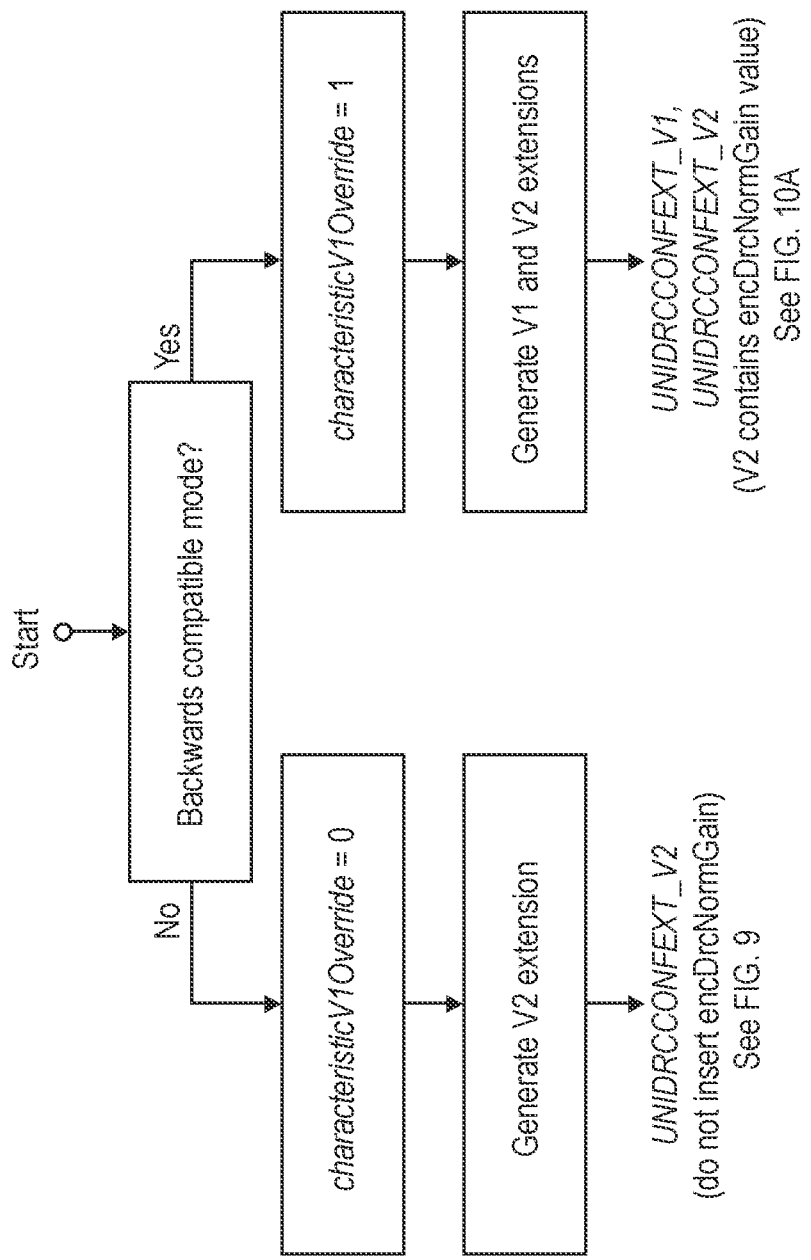
FIG. 8 is a flow diagram of a new encoder side process that can generate backwards compatible and non-backwards compatible MPEG-D DRC bitstream extensions.

Turning now to FIG. 8, this is a flow diagram of a new, encoder side process that can generate both backwards compatible and non-backwards compatible MPEG-D DRC bitstream extensions, for DRC by a decoder side. A backwards compatible bitstream extension field or payload is one that can be processed by a legacy decoder (decoder side process) to perform DRC as per the extension but without loudness normalization (when applying DRC to a decoded audio signal.) An example of such a legacy decoder can be seen in FIG. 6. A non-backwards compatible bitstream extension is one that cannot be processed by the legacy decoder (to produce compressed audio.) This dual feature may be enabled as follows.

Figure 10A:
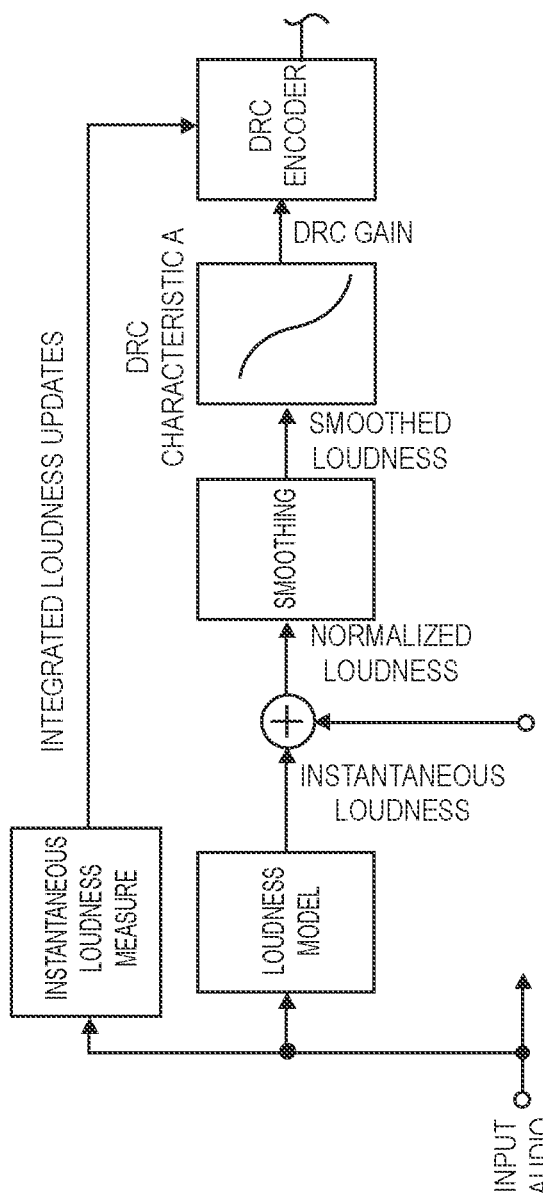
FIG. 10A and FIG. 10B are a block diagram of an MPEG-D DRC compliant audio codec system in which a backwards compatible encoder side produces a backwards compatible bitstream that is being processed by both a new decoder and a legacy decoder.

A flag may be defined that is contained in the bitstream, referred to as for example characteristicV1 Override. The encoder side may set or clear this flag, as follows. To produce a backwards compatible bitstream, the flag is given a first value such as characteristicV1Override=1, and in that case the bitstream will also contain a loudness normalization gain, also referred to as encDrcNormGainDb. In this mode, the encoder side process determines the first DRC gain sequence by applying the audio signal to the first DRC characteristic with loudness normalization, using the loudness normalization gain (also referred to here as an encoder side DRC normalization gain.) See FIG. 10A and FIG. 10B which is a block diagram of an MPEG-D DRC compliant audio codec system in which a backwards compatible encoder side produces a backwards compatible bitstream that is being processed by both a new decoder and a legacy decoder. In the case where the input audio is a live recording, integrated loudness updates are also being computed and provided to the encoder (to be incorporated into the bitstream.) The loudness normalization gain may be computed as shown in FIG. 10A, by subtracting a predicted program loudness value from the DRC input loudness target (assuming units of dBA, for example)

Figure 10B:
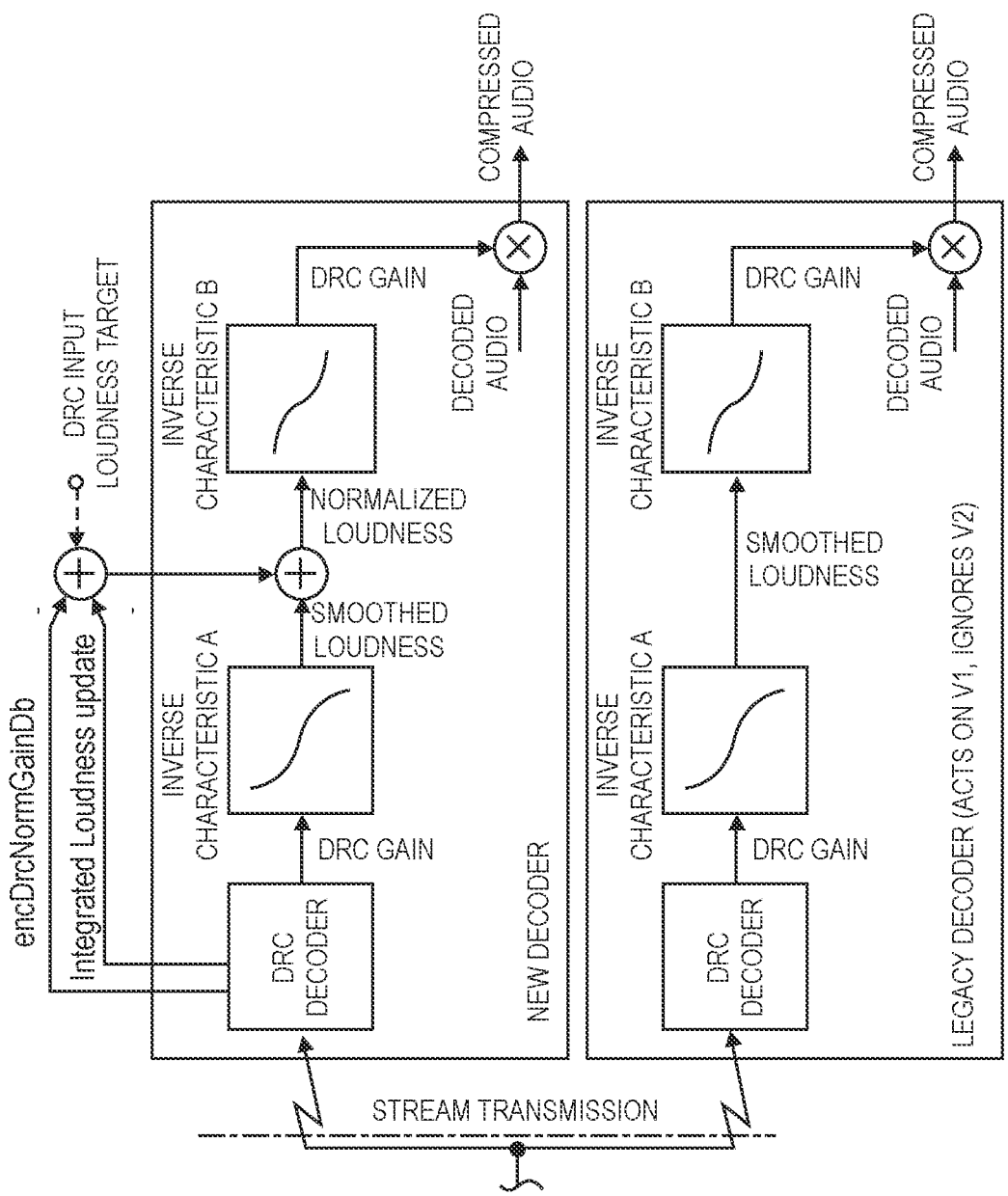

The loudness normalization gain, encDrcNormGainDb, is the value that is applied in a new, backwards compatible encoder side process, in order to produce a backwards compatible bitstream in which the DRC gain sequence was obtained with loudness normalization (to DRC characteristic A.) This bitstream can be processed by both a new decoder and a legacy decoder, for example as shown in FIG. 10B. When this bitstream is processed by a legacy decoder, the latter does not apply loudness normalization during DRC. When the bitstream is processed by a new decoder that applies loudness normalization during DRC, encDrcNormGainDb is used to compensate for or neutralize or undo the application of encDrcNormGainDb by the backwards compatible encoder, in order to apply a more accurate loudness normalization using the integrated loudness update. In other words, the processor of the new decoder compensates for the encoder side DRC normalization gain, when applying a decoder side DRC loudness normalization.

Returning to FIG. 8, to enable its processing by both legacy and new decoders, the backwards compatible bitstream may also contain, when the flag has the first value, e.g., characteristicV1Override=1, a first DRC configuration field, e.g., UNIDRCCONFEXT_V1, and a second DRC configuration field, e.g., UNIDRCCONFEXT_V2. The first DRC configuration field instructs a decoder side process to apply DRC to the decode audio signal without loudness normalization, for example as seen in the legacy decoder block of FIG. 10B. The second DRC configuration field instructs a decoder side process to apply DRC to the decoded audio signal with loudness normalization, for example as seen in the new decoder block of FIG. 10B.

Figure 9:
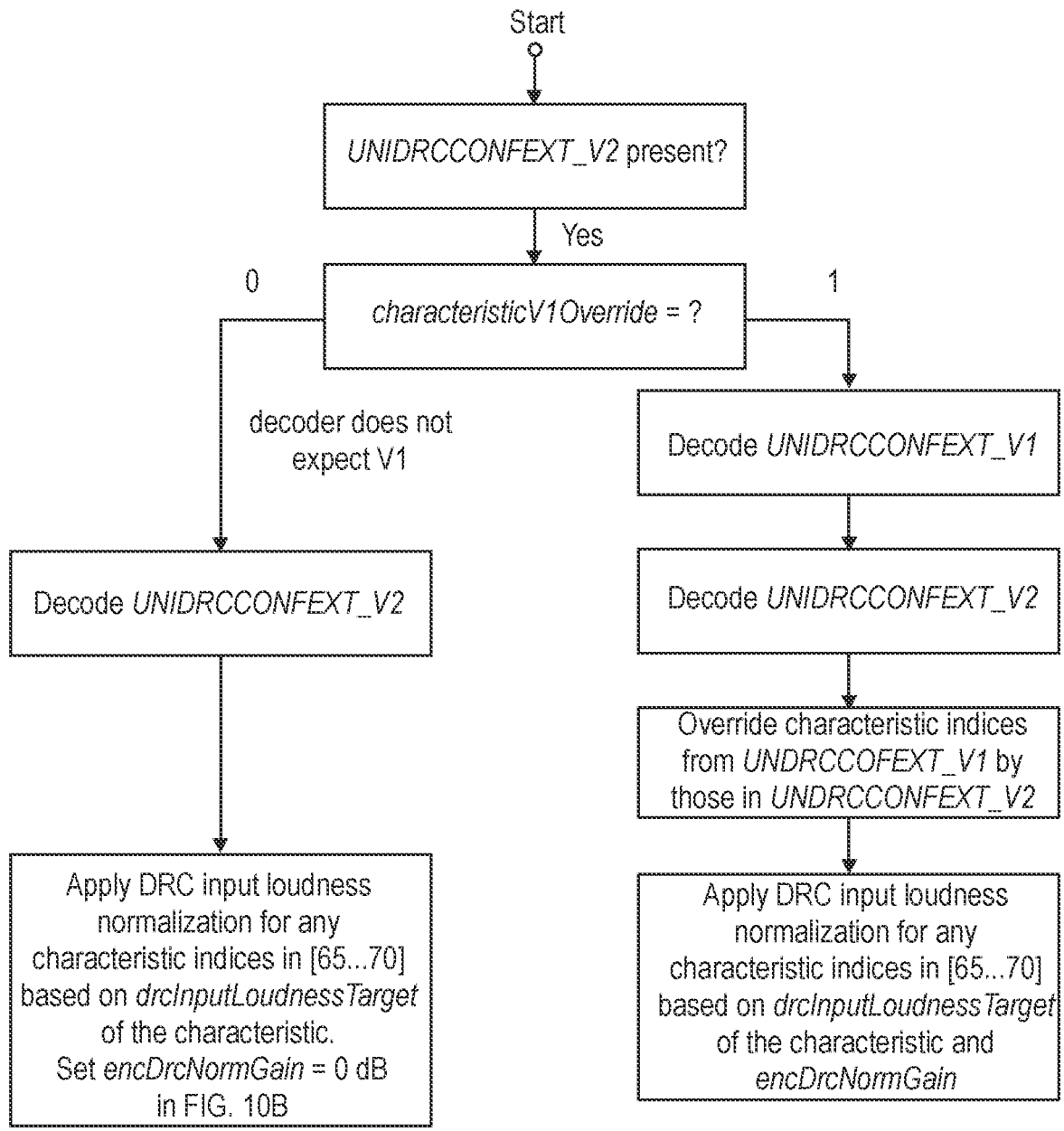
FIG. 9 is a flow diagram of a new decoder side process that can produce a DRC gain sequence using either backwards compatible or non-backwards compatible MPEG-D DRC bitstream extensions.

Still referring to FIG. 8, the new encoder side can create a non-backwards compatible MPEG-D DRC bitstream extension (one that cannot be processed by a legacy decoder to produce compressed audio), as follows. Note that the encoder side may wish to do so if it recognizes that only a new decoder side will be processing the bitstream. In such a bitstream, the flag has a second value, e.g., characteristicV1Override=0, and the bitstream does not contain a loudness normalization gain (that is intended for use by the decoder side.) In addition, the first DRC configuration field, e.g., UNIDRCCONFEXT_V1, is also omitted from the bitstream. FIG. 9 shows a new decoder, which can process such a bitstream. In other words, when the flag has the second value, e.g., characteristicV1Override=0, the bitstream contains the second DRC configuration field and not the first DRC configuration field.

FIG. 9 is a flow diagram of a new decoder side process that can produce a DRC gain sequence using either backwards compatible or non-backwards compatible MPEG-D DRC bitstream extensions. The process may begin with parsing the bitstream to detect the second DRC configuration field, e.g., UNIDRCCONFEXT_V2, and the flag, characteristicV1Override. In response to the flag having the first value, e.g., characteristicV1Override=1, the process applies DRC to the audio signal for example as shown in FIG. 10B (new decoder block), using the DRC characteristic B and with loudness normalization that uses i) the loudness normalization gain (e.g., encDrcNormGainDb) and ii) the plurality of instances of integrated loudness update (both of which are decoded from the obtained bitstream by the DRC decoder along with the audio signal.)

In one aspect, still referring to FIG. 9, when the flag has the first value, e.g., characteristicV1Override=1, the index of the first DRC characteristic that may be contained in the first DRC configuration field is overridden by the index of the first DRC characteristic that is contained in the second DRC configuration field. For example, the MPEG-D DRC may define DRC characteristics 1-6 which are recognizable by legacy MPEG-D DRC decoders (also referred to here as legacy index values or a legacy range.) In this disclosure, in accordance with an enhanced MPEG-D DRC procedure, those same characteristics are duplicated with different index values (also referred to here as new index values or a new range), e.g., 65-70. In other words, the legacy characteristics can be referenced by either their legacy indices 1-6, or by their new indicates 65-70; their parameters remain the same, as seen in the table below.

TABLE 6

Parameters of DRC characteristics in index ranges 1 to 6 and 65 to 70

| | DrcCharacteristic | | | | | |
|---|---|---|---|---|---|---|
| Parameter | 1, 65 | 2, 66 | 3, 67 | 4, 68 | 5, 69 | 6, 70 |
| ioRatio | 0, 0 | 0, 2 | 0, 4 | 0, 6 | 0, 8 | 1, 0 |
| expLo | 9, 0 | 9, 0 | 9, 0 | 9, 0 | 6, 0 | 5, 0 |
| expHi | 12, 0 | 12, 0 | 12, 0 | 12, 0 | 8, 0 | 6, 0 |

When a new encoder side process generates a backwards compatible bitstream (characteristicV1Override=1, right side of the flow diagram in FIG. 8), it generates both the first (V1) and second (V2) DRC configuration extension fields, where the first DRC configuration field refers to one or more of the legacy indices 1-6, not any of the new indices 65-70, to enable backwards compatibility with legacy decoders. The V2 extension field may refer to one or more of the new index values, or it may refer to one or more of the legacy index values.) The new index values effectively signal a new decoder (one that follows the enhanced MPEG-D DRC procedure in this disclosure) that loudness normalization may be required when it is producing a second DRC gain sequence. Only the UNIDRCCONFEXT_V2 extension supports DRC characteristic indices 65-70 which require loudness normalization in the decoder.

A new decoder side process may decode both the V1 and V2 extension fields as shown in the right side of FIG. 9, resulting in extracting two indices (two different index values) that point to the same, DRC characteristic A. The V2 index is said to override the V1 index in this case, because characteristicV1Override=1, in that the new decoder will replace the DRC characteristic indices obtained from the UNIDRCCONFEXT_V1 extension by the ones from the UNIDRCCONFEXT_V2 extension.

Returning to FIG. 8, when a non-backwards compatible bitstream is generated (to be provided to a new decoder, not a legacy decoder), the flag, characteristicV1Override is set to zero and the UNIDRCCONFEXT_V2 extension is generated in the bitstream. The UNIDRCCONFEXT_V2 extension contains substantially the same bitstream fields as the UNIDRCCONFEXT_V1 extension. While UNIDRCCONFEXT_V1 does not support characteristics 65-70, the transmitted UNIDRCCONFEXT_V2 does. Since loudness normalization for generating the DRC sequence in the encoder side is not applied in this case—see FIG. 7—it is not compensated for in the decoder (as also seen in FIG. 7.) That situation is equivalent to setting the normalization gain, e.g., encDrcNormGainDb, to zero in the decoder side process of FIG. 10B. When such a bitstream is parsed by the new decoder side process, in response to i) the flag having the second value and ii) the index being a first value (e.g., in the range 65-70), the decoder side process applies DRC to the audio signal using the second DRC characteristic B and with loudness normalization that uses the integrated loudness update but without using the loudness normalization gain (e.g., the value of encDrcNormGainDb in the summation block is set to zero.) In other words, encDrcNormGainDb is set to zero when generating the normalized loudness sequence at the input of DRC characteristic B.

If, however, the new decoder encounters i) the flag having the second value and ii) the index being a second value that is different than the first value (e.g., in the range 1-6), then the decoder side process applies DRC to the audio signal (using the second DRC characteristic B) but without loudness normalization. In other words, referring to FIG. 10B, the recovered, smoothed instantaneous loudness sequence at the output of the inverse characteristic A is not adjusted (before being input to the DRC characteristic B)—the summation block shown in that figure is thus absent.

The Appendix below includes a draft specification of the proposed method for deferred loudness normalization in the framework of the MPEG-D DRC standard. The document includes an efficient method to generate bitstreams with the new information that can also be decoded with legacy decoders.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. An audio decoder apparatus comprising:
a processor; and
memory having stored therein instructions that configure the processor to obtain a bitstream, the bitstream comprising:
an encoded version of an audio signal,
a first dynamic range control, DRC, gain sequence, that was determined by an encoder side process applying the audio signal to a first DRC characteristic,
a loudness normalization gain that was applied by the encoder side process when determining the first DRC gain sequence,
an index of the first DRC characteristic, wherein the index identifies or points to the first DRC characteristic, and
an integrated loudness update.

2. The audio decoder apparatus of claim 1 wherein in response to the index having a first value the processor performs loudness normalization when applying DRC to the audio signal.

3. The audio decoder apparatus of claim 1
wherein the memory has stored therein instructions that configure the processor to perform loudness normalization after applying an inverse DRC characteristic to the first DRC gain sequence, by using the loudness normalization gain in the bitstream to compensate for or undo the loudness normalization gain that was applied by the encoder side process when determining the first DRC gain sequence.

4. The audio decoder apparatus of claim 1 wherein the memory has stored therein instructions that configure the processor to
recover a loudness sequence by applying the first DRC gain sequence to an inverse of the first DRC characteristic,
perform loudness normalization upon the recovered loudness sequence, produce a second DRC gain sequence by applying the recovered loudness sequence to a second DRC characteristic, and apply the second DRC gain sequence to the audio signal.

5. The audio decoder apparatus of claim 4 wherein the loudness normalization gain is in units of dB, and performing loudness normalization comprises combining the loudness normalization gain with the recovered loudness sequence and the integrated loudness update.

6. The audio decoder apparatus of claim 4 wherein performing the loudness normalization comprises shifting the second DRC characteristic along its input axis by an amount that is based on the loudness normalization gain and the integrated loudness update.

7. The audio decoder apparatus of claim 4 wherein the processor calculates an update to a normalization gain as a difference between a DRC input loudness target and the integrated loudness update and performs the loudness normalization upon the recovered loudness sequence by adding the normalization gain to the recovered loudness sequence to produce a normalized loudness sequence, and wherein the processor produces the second DRC gain sequence by applying the normalized loudness sequence to the second DRC characteristic to produce the second DRC gain sequence.

8. The audio decoder apparatus of claim 1 wherein the audio signal is a sound program that is being played back in the audio decoder apparatus, and the integrated loudness update is a measure of integrated loudness for only a portion of the sound program that has been played back.

9. The audio decoder apparatus of claim 1 wherein the integrated loudness update represents an average integrated loudness of the audio signal.

10. The audio decoder apparatus of claim 1 wherein the processor is configured to extract from the bitstream the index to the first DRC characteristic and use the extracted index to obtain an inverse of the first DRC characteristic, recover a loudness sequence by applying the first DRC gain sequence to the inverse of the first DRC characteristic, if the index has a first predefined value, then calculate a normalization gain update as a difference between i) a DRC input loudness target and ii) a sum of the integrated loudness update and the loudness normalization gain, and add the normalization gain update to the recovered loudness sequence to produce a normalized loudness sequence, produce a second DRC gain sequence by applying the normalized loudness sequence to a second DRC characteristic, and apply the second DRC gain sequence to the audio signal.

11. The audio decoder apparatus of claim 10 wherein the processor is configured to, if the index has a second predefined value, then produce the second DRC gain sequence by applying the recovered loudness sequence without loudness normalization, to the second DRC characteristic.

12. An audio decoder apparatus comprising:

a processor; and memory having stored therein instructions that configure the processor to obtain a bitstream, the bitstream comprising:

an encoded version of an audio signal, a first dynamic range control, DRC, gain sequence, that was determined by an encoder side process applying the audio signal to a first DRC characteristic, an index of the first DRC characteristic, wherein the index identifies or points to the first DRC characteristic, an integrated loudness update, and a flag, wherein when the flag has a first value the bitstream contains an encoder side loudness normalization gain, or when the flag has a second value the bitstream does not contain the encoder side loudness normalization gain.

13. The audio decoder apparatus of claim 12 wherein in response to the flag having the first value, the processor applies DRC to the audio signal using a second DRC characteristic and with loudness normalization using i) the encoder side loudness normalization gain and ii) the integrated loudness update.

14. The audio decoder apparatus of claim 12 wherein in response to i) the flag having the second value and ii) when the index has a first value, the processor applies DRC to the audio signal using a second DRC characteristic and with loudness normalization that uses the integrated loudness update but without using the encoder side loudness normalization gain.

15. The audio decoder apparatus of claim 14 wherein in response to the index being a second value that is different than the first value, the processor applies DRC to the audio signal using the second DRC characteristic but without loudness normalization.

16. An audio decoder apparatus comprising:

a processor; and memory having stored therein instructions that configure the processor to obtain a bitstream, the bitstream comprising:

an encoded version of an audio signal, a first dynamic range control, DRC, gain sequence, that was determined by an encoder side process applying the audio signal to a first DRC characteristic, an index of the first DRC characteristic, wherein the index identifies or points to the first DRC characteristic, an integrated loudness update, and an encoder side DRC normalization gain;

wherein the processor compensates for the encoder side DRC normalization gain when applying a decoder side DRC loudness normalization.

17. The audio decoder apparatus of claim 16 wherein the memory has stored therein instructions that configure the processor to compensate for the encoder side DRC normalization gain by undoing a loudness normalization gain that was applied by the encoder side process when determining the first DRC gain sequence.

18. The audio decoder apparatus of claim 16 wherein the bitstream comprises a flag, and when the flag has a first value, the first DRC gain sequence was determined by the encoder side process applying the audio signal to the first DRC characteristic with loudness normalization.

19. The audio decoder apparatus of claim 18 wherein when the flag has a second value, the first DRC gain sequence was determined by the encoder side process applying the audio signal to the first DRC characteristic without loudness normalization.

20. A digital audio method comprising:

obtaining a bitstream, the bitstream comprising an encoded version of an audio signal, a first dynamic range control, DRC, gain sequence, that was determined by an encoder side process applying the audio signal to a first DRC characteristic, an index of the first DRC characteristic, wherein the index identifies or points to the first DRC characteristic, and an integrated loudness update;

using the index to obtain an inverse DRC characteristic;

performing loudness normalization after applying the inverse DRC characteristic to the first DRC gain sequence, to produce a normalized loudness sequence;

applying the normalized loudness sequence to a second DRC characteristic to produce a second DRC gain sequence; and applying the second DRC gain sequence to the audio signal to produce compressed audio.

21. The method of claim 20 wherein applying the normalized loudness sequence comprises adjusting the normalized loudness sequence and then applying the adjusted normalized loudness sequence to the second DRC characteristic to produce the second DRC gain sequence.

\* \* \* \* \*